United States Patent [19]

Plackett

[11] 4,137,987
[45] Feb. 6, 1979

[54] STAY SUPPORTED MEMBRANE PLANING SEAL

[75] Inventor: Michael J. Plackett, San Diego, Calif.

[73] Assignee: Rohr Industries, Inc., Chula Vista, Calif.

[21] Appl. No.: 754,478

[22] Filed: Dec. 27, 1976

Related U.S. Application Data

[63] Continuation-in-part of Ser. No. 632,184, Nov. 17, 1975, abandoned.

[51] Int. Cl.² .............................................. B60V 1/04
[52] U.S. Cl. .................................................. 180/126
[58] Field of Search ............... 180/126, 127, 128, 117, 180/118, 129; 114/67 A

[56] References Cited

U.S. PATENT DOCUMENTS

| | | | |
|---|---|---|---|
| 3,204,715 | 9/1965 | Maloof | 114/67 A |
| 3,288,236 | 11/1966 | Padial | 180/126 |
| 3,379,270 | 4/1968 | Hardy | 180/127 |
| 3,532,180 | 10/1970 | Ford | 180/126 |
| 3,536,154 | 10/1970 | Faure | 180/127 X |
| 3,805,913 | 4/1974 | Jackes | 180/128 |
| 3,866,707 | 2/1975 | Paoli | 180/127 |

FOREIGN PATENT DOCUMENTS

| | | | |
|---|---|---|---|
| 1089464 | 11/1967 | United Kingdom | 180/127 |
| 1220081 | 1/1971 | United Kingdom | 180/128 |

*Primary Examiner*—John P. Silverstrim
*Attorney, Agent, or Firm*—Patrick J. Schlesinger; Frank D. Gilliam

[57] ABSTRACT

A planing seal for a vehicle having a hull with downward extending sidewalls. The seal comprises a plurality of juxtaposed supporting stays positioned parallel to and between the extended hull sidewalls. These supporting stays are connected to the hull at their forward end and remain free at their rearward end. A plurality of forming cables are attached to the hull at one of their ends and at least one of the plurality of cables attach to at least one of the supporting stays intermediate its ends. The cables have a length selected to provide a curvilinear form to the supporting member which allows independent freedom of movement of the stays toward the hull cable attach point. A flexible, non-permeable membrane extends the width of the hull between the sidewall extensions. The membrane has a spaced-apart sealed attachment to the hull fore and aft. The combination of the extended sidewalls and membrane hull attachments provide a pressurizable plenum chamber with seals supported by the stays.

6 Claims, 7 Drawing Figures

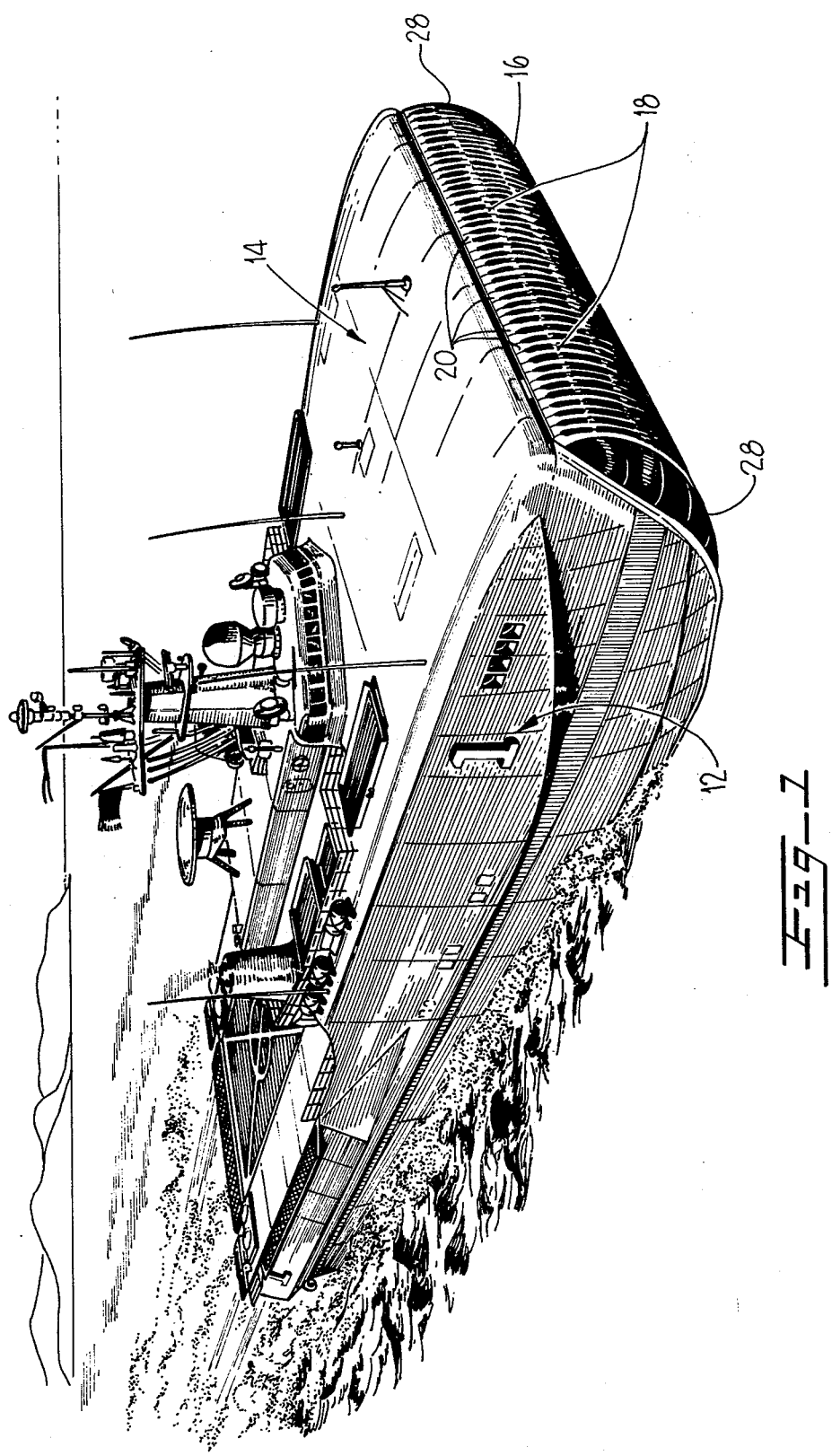

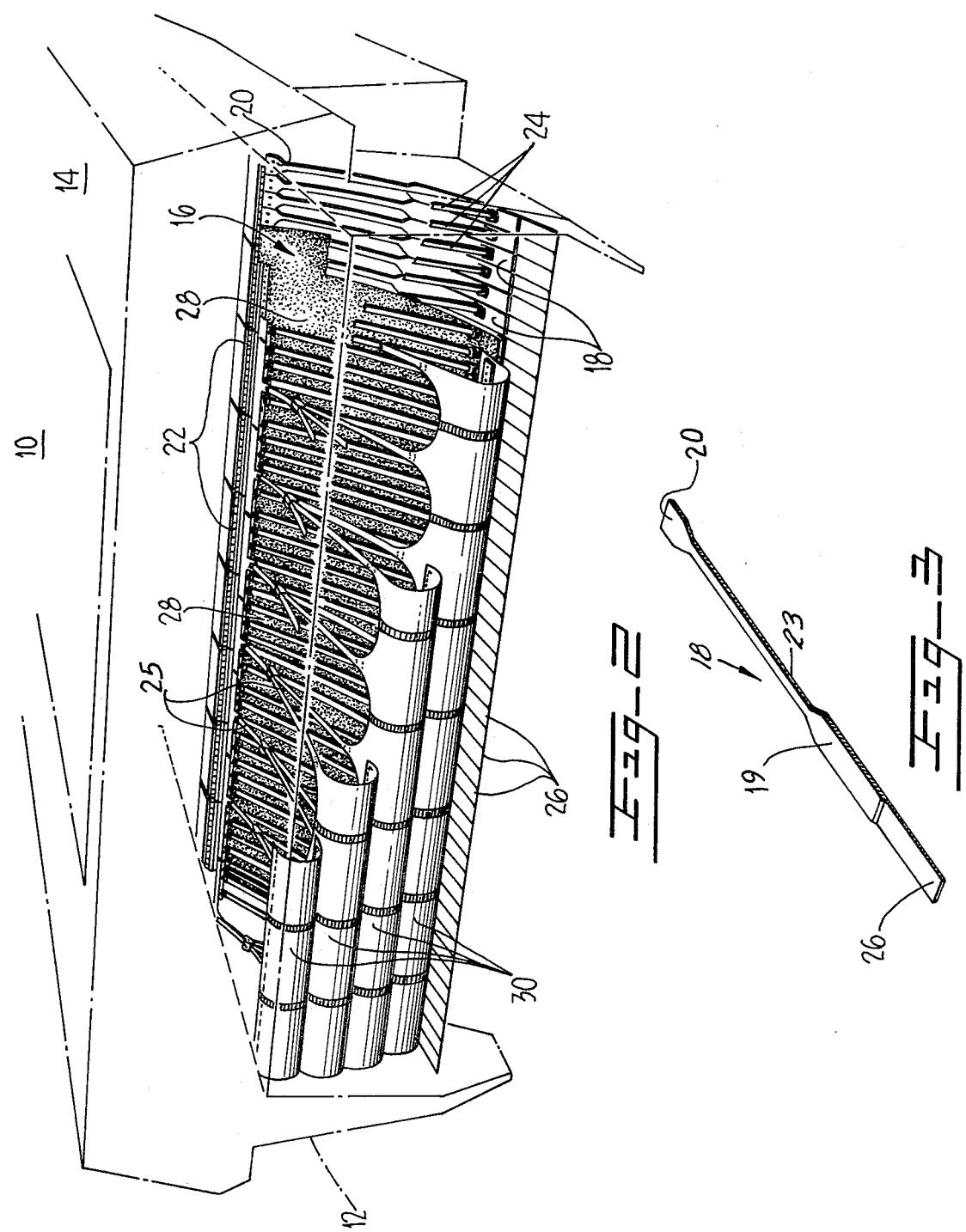

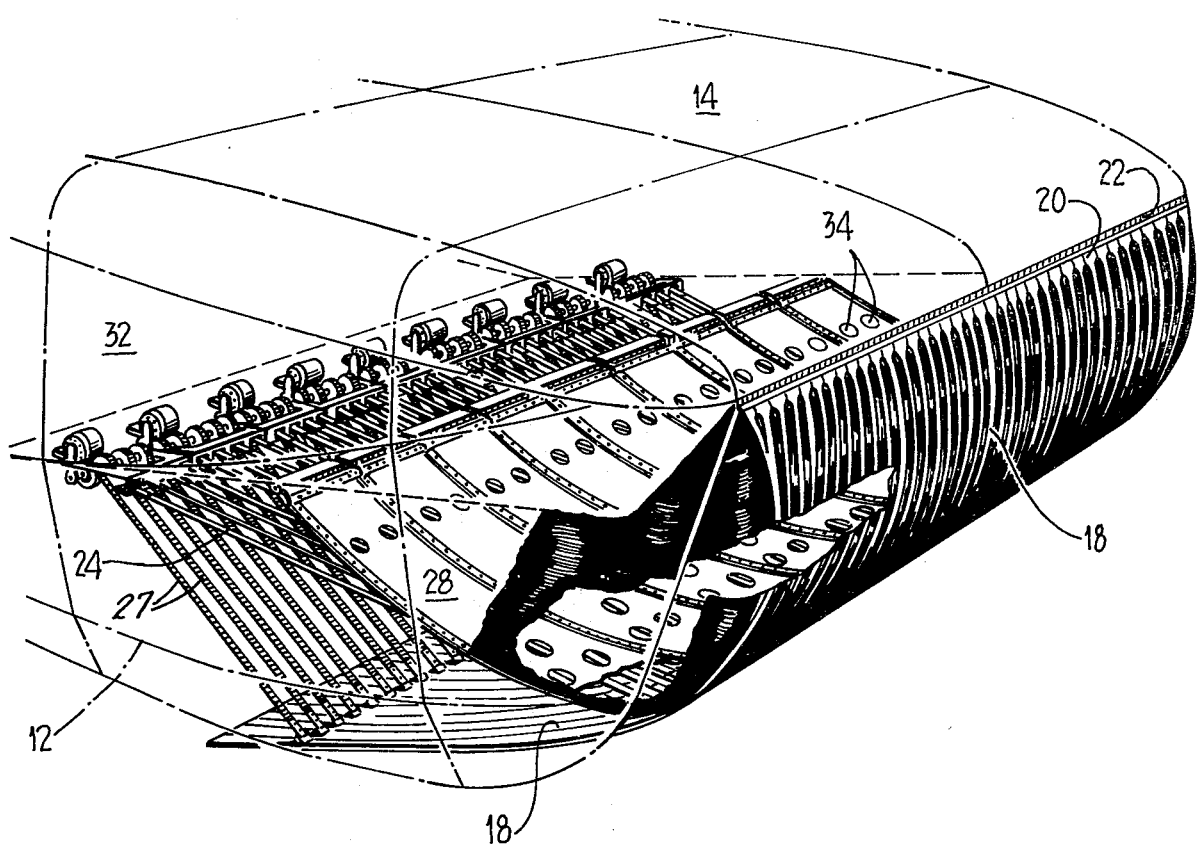
Fig_6
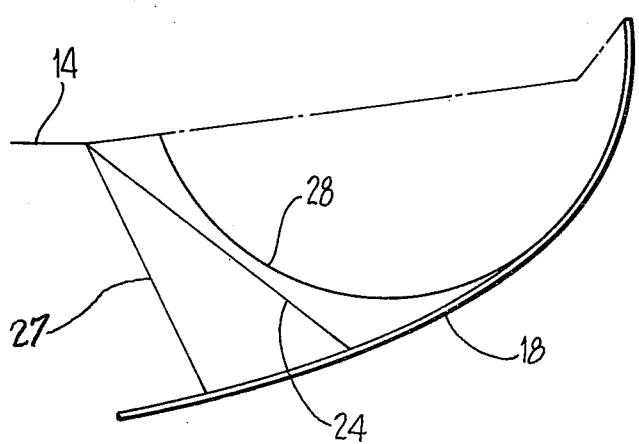
Fig_7

STAY SUPPORTED MEMBRANE PLANING SEAL

This is a continuation-in-part of application Ser. No. 632,184 filed Nov. 17, 1975 now abandoned.

BACKGROUND OF THE INVENTION

The invention herein described was made in the course of or under a contract or subcontract thereunder, with the Navy Department.

The present invention relates to a planing seal for a gas cushion vehicle. In particular, this invention relates to apparatus for providing a flexible skirt, that in concert with the vehicles body or hull provides a plenum chamber for the containment of the gaseous fluid cushion.

Air cushion vehicles may have flexible skirt assemblies, made from suitable flexible impermeable material, to act as barriers to the escape of the air cushion. One of the difficulties encountered with state of the art flexible skirt assemblies is that when the vehicle traverses the support surface, the assemblies encounter considerable wear resulting in the constant cost of replacement and vehicle down time.

Another difficulty encountered is the lack of sufficient skirt flexibility to maintain a minimum clearance above the surface when the vehicle develops heave, pitch and roll motions during high forward speeds.

These and other disadvantages have not been successfully overcome until the emergence of the instant invention.

SUMMARY OF THE INVENTION

The planing seal of the instant invention comprises a flexible membrane constructed of conventional material and supported in part and separated from the supporting surface by a plurality of juxtaposed elongated supporting stays positioned parallel to the sides of the vehicle body or hull. The stays are attached to the ship at their forward end surface with their rearmost end free for independent and separate movement. Each stay is further attached to the hull intermediate its ends through a cable or forming member.

This manner of construction provides a surface that when exposed to the surface being traversed, exhibits a planing action and high resistance to wear and abrasion.

The membrane supported in this manner does not come into physical contact with the traversed surface in order to sustain cushion pressure. The combined membrane and stay flexibility manifests itself not only in response to deflections in the direction and plane of forward motion to compensate for heave and pitch displacement, but also in the crosswise or lateral direction to accommodate rolling motion.

To this end the invention disclosed herein proposes several distinct and novel features for providing the necessary compliance, by aerodynamic properties, and wear resistant qualities disclosed.

The above and other features of the invention will be readily apparent as the description continues while being read in conjunction with the appended drawings.

DESCRIPTION OF THE DRAWINGS

FIG. 1 is a perspective view of a vehicle employing the planing seal of the invention.

FIG. 2 is a partial cutaway view of the stern of the vehicle of FIG. 1.

FIG. 3 is a perspective view of a single supporting stay.

FIG. 6 is a partial cutaway view of the bow of the vehicle of FIG. 1.

FIG. 7 is a diagrammatic side view of a second embodiment of the planing seal.

DETAILED DESCRIPTION OF THE FIRST EMBODIMENT

Figure 4:
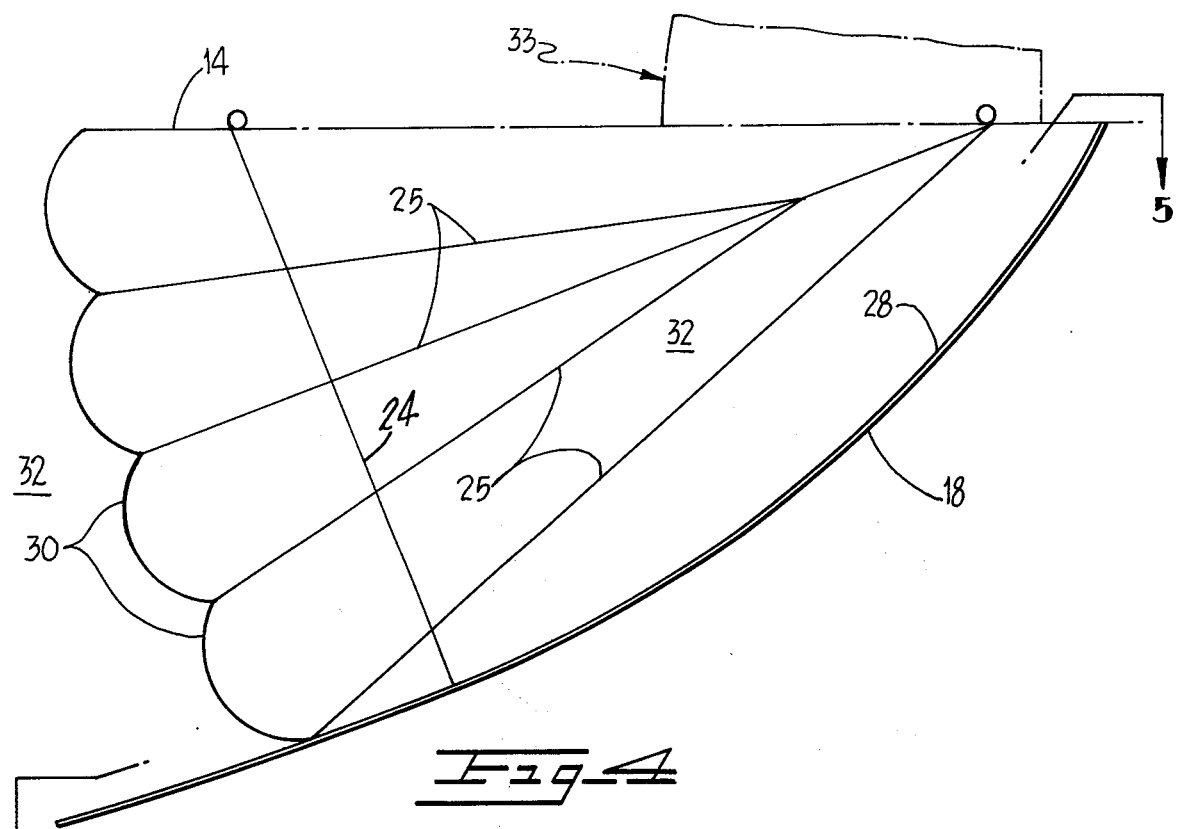
FIG. 4 is a diagrammatic side view of FIG. 2 emobodiment of the planing seal.

The structure herein described is not limited in use to a vehicle traversing over a body of water, but can also be used by any other type vehicle or traversing surface. It is merely desired to form this invention in a representative environment for ease of explanation.

Throughout the drawings and specifications, the same numerals are used in the various figures to indicate the identical element or part.

Referring now to FIG. 1, a surface effect ship 10 has sidewalls 12 extending downward from the deck 14 for engagement with the supporting water surface. A bow planing seal 16 with supporting stays 18 is shown.

FIG. 2 is a showing of stern of ship 10 including the deck portion 14, the sidewalls 12 and the seal 16. The seal 16 is constructed of a plurality of side by side flexible stays 18 (see FIG. 3). The stays are of small width in comparison to their lengths, tapered in thickness or varied in width or both to vary stiffness along its length so that they have a forward and rearward flexible portions, 23, 26 respectively with a stiff portion 19 positioned therebetween. The stiff intermediate portion 19 as well as the flexible rearward portion 26 act as a planar surface for riding over the surface discontinuities, i.e., waves in the same manner as a water ski. In accomplishing this function, the planar section 19, 26 will experience forward and aft forces as drag is developed during wave encounter. In order to isolate the resulting motion generated by the planar section reaction to those forces from the vehicle 10, the planer section ideally would be suspended by the flexible means such that the planer would be able to react to induced drag loads by deflection fore and aft. This method of mounting is, of course, not in equilibrium; to effect the required equilibrium, a force must be applied to the upper surface of the planer section to maintain the planer portion and support the vehicle. This is provided by membrane 28, hereinafter discussed, which is provided with an internal gas pressure that is induced between the vessel's lower hull (wet deck) 14 and the planer section. This pressure must be contained in the forward and aft extremities of the vessel. This is accomplished by providing a rear and forward seal from membrane 28 as hereinafter explained. The internal pressure will billow out the forward membrane, the planer is free to move forward, aft, and vertically in response to the wave action without transmitting any motion to the vessel. A feature of this stay configuration is its ability to deflect forward or aft in response to the planer motion. The stays may be constructed of any suitable material that exhibits sufficient elasticity to flex in infinite number of times without breaking. An example of such material that may be utilized is, but not limited to, metal, fibreglass resin, GRP systems and the like. The stays are supported at their forward end 20 by a hinge type attachment 22 to the vehicle hull 14. A former cable 24 is attached to the hull some distance aft of the hinge 22 and secured at its other end to the lower end of the stay 18 some distance from its free or unattached end 26. The cable length is selected so as to effect a curved shape to the stay when subjected to a positive gaseous pressure differential on its upper or hull side, leaving the free end capable of deflection within the cable length independent of the restrained portion of the stay 18. The former cables may be constructed of any suitable material having sufficient strength to support the required load and may be in the shape of cables, straps, etc. Additional stays are secured and formed in the same manner across the width of the vehicle terminating at each side against the vehicle sidewalls 12 which, as shown, extend down and are fully submerged in the water. The stays may be connected laterally to one another by flexible membrane 28 or may be free between their ends and support the membrane 28 on their upper surfaces. The membrane may be fabricated from a flexible resilient impervious material such as, but not limited to, reinforced, rubber, neoprene and the like. In either manner, the stays and membrane effect a continuous skirt consisting of the membrane supported to a controlled contour by stays. The relative spacing of the stays 18, the amount of stay area occupied by the membrane and the ratio of stay width and thickness to spacings are dependent variables inherent in the implementation of the design. Inasmuch as stay and membrane data are variable within the constraints of the design, so too are the number and location of the former cables 24.

Figure 5:
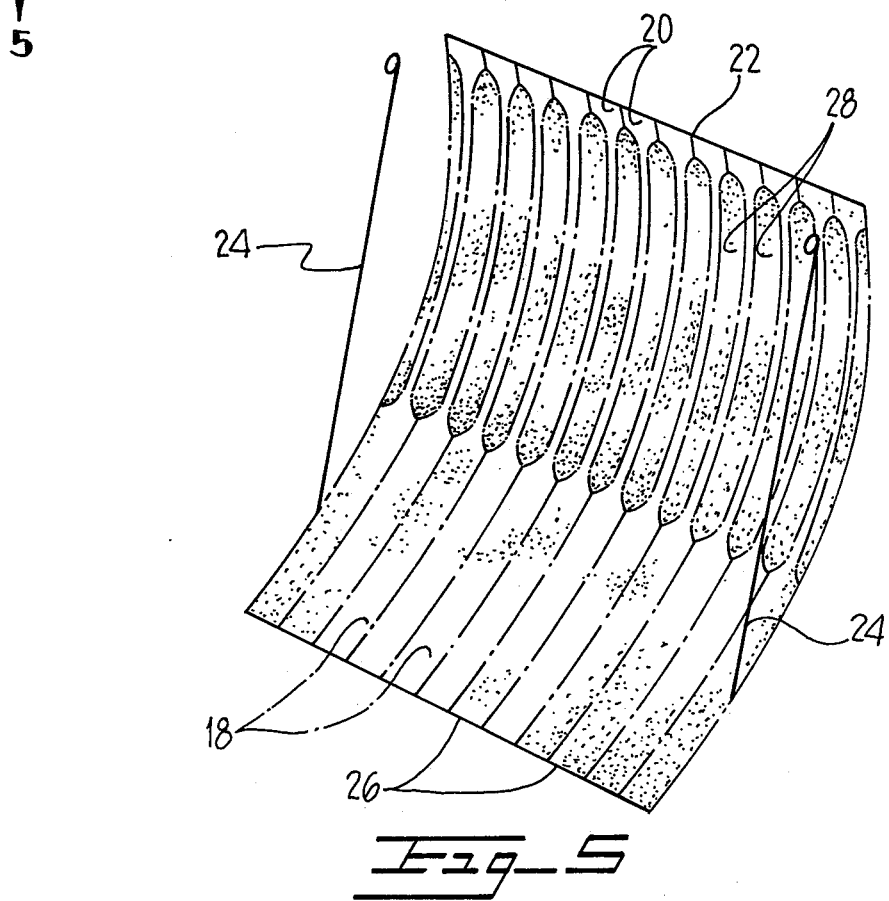
FIG. 5 is a view of FIG. 4 taken along lines 5—5.

The aft portion of membrane 28 is gathered to form a plurality of convolutes 30. The convolutes are held in place by additional cables 25 constructed as cables 24. The number of convolutes gathered in this manner is a function of the amount of unsupported span required or allowed within the constraints of the aforementioned variables, which include gas pressure differential, membrane strength and geometric limitation inherent in the design implementation, and as such constitutes a dependent variable. This apparatus yields a plenum chamber 32 of a three sided cross-section bounded at its top by the vehicle hull 14, at its forward extremity by a curved stay stiffened membrane assembly and at its aft extremity by a convoluted flexible membrane. The two ends of this plenum being closed off by submerged side hull structure. The internal portions of the membrane constitute load balancing members only, capable of holding the convoluted shape of the flexible membrane portion in its predetermined contour relationship and as such they offer little or no resistance to free gaseous motion within the plenum chamber created by this total assembly. The internal portion of the membranes, therefore, will be vented or tapered in such a manner as to efficiently perform their load carrying in a lateral plane and their internal venting function see FIG. 5.

DETAILED DESCRIPTION OF THE SECOND PREFERRED EMBODIMENT

In the aforementioned description, no consideration has been made relative to the position of the main cushion or lift pressure as described in the planing seal of the first embodiment which could apply to both fore and aft position, however, consideration of the position of the cushion area pressure will allow for certain changes resulting in a less complex structure.

If the cushion area pressure is considered as existing aft of the free edge, i.e., the seal is being utilized as a forward seal, pressure sufficient to provide a downward force on the stay or planer surface exists within the cushion area, it no longer becomes necessary to provide the convoluted portion 30 of flexible membrane 28, see FIGS. 2 and 4, as would be required in an aft application due to the existence of ambient pressure aft of this flexible membrane. Variations in pressure along the planing surface may be obtained, and thereby variable flexibility or stiffness of the seal system, by removing the aft convoluted portion 30 of this membrane 28 and relocating the aft membrane hull connection forward of the former cables 24 attachment.

Referring now specifically to FIGS. 6 and 7, a stay supported membrane planing apparatus is mounted as hereinbefore discussed. The flexible membrane 28 is attached at the upper stay 18 attachment position on hull 14 and terminated aft of this point in such a manner as to effect a curved shape of predetermined contour when subjected to a pressure rise originating from the hull side. Additional forming cables 27 are installed to provide restraint and contour control to the planer section. The necessity for aft containment of the plenum chamber 32, is no longer required, therefore, membrane 28 will not be attached to the planer stays, but will function as a separately inflated unit, i.e., separate from the planer pressure system. The membrane 28 may also be provided with bleed holes 34 that allow for free flow of air from it to the main cushion area 36 aft of the bow seal and thereby by the size, location and quantity of holes 34 provide a controlled compression or deflation rate when subjected to upward deflection of the planer action.

OPERATION OF THE PREFERRED EMBODIMENTS

Gas pressure is introduced from the hull side of the plenum chamber 32 at location 33, see FIG. 4, to create a pressurized chamber, that when balanced by controllable ducting systems (not shown) to the area forward or aft of this plenum chamber, effects a cushion area reaction against the water surface and the vehicle hull and a seal area exhibiting the properties of a spring. The stiff, curved surface of the stay supported membrane assembly, functions as a planing member when subjected to the surface of the water being traversed. During traversing, encounters with nominally even water surfaces, the stay supported membrane assembly element of the seal component will be balanced by the seal and cushion pressure ratios to assume a partially submerged position such that this element will be subjected to a planing action due to the hydrodynamic forces encountered, thereby decreasing the drag component that would otherwise be induced by a submerged or contact type seal element and providing a lift component to augment the main cushion lift requirements. The controlled shape, the materials of construction available for the design of members having the properties of flexibility of the stays 18, and their multiplicity of occurrence as a total portion of the entire element area, contribute to an increase in the design life predictability of such a seal element in comparison with a membrane only type of assembly, without sacrificing lateral flexibility. During encounters with water conditions conducive to the initiation of heave or pitching motion to the vehicle via the water contacting elements, the planing element of the seal will be deflected aft due the increased drag induced by the hydrodynamic action imposed upon it by the force of the increased volume of water to which it is exposed.

The low inertia of the seal system as opposed to the large inertia of the vehicle to which it is attached will effect a decrease in the volume of the seal area plenum chamber caused by the rotation of the stay supported membrane assembly about its forward attachment point. This action brings about a change in the contour of the stay supported membrane assembly to one of decreased curvature. This change in contour performs the function of allowing the planer surface to lay flat against the vehicle under hull when fully deflected, thus facilitating stowing when the system is inoperative and as a stiffened member does not tend to lose its smooth planing surface contour due to local, unbalanced pressure gradients as could an unstiffened member. Therefore, the stay supported membrane assembly functions as a smooth, variable contour planing surface. In conjunction with the aft deflection of the seal element system by rotation of the stay supported membrane assembly, the decrease in volume of the seal area plenum chamber causes a rise in the gaseous pressure of this chamber which increases its relative stiffness and at a predetermined rise in this chamber pressure a transfer of gas occurs from the plenum through its supply port, at location 33 of FIG. 4, into the main cushion area. The cumulative results of the energy absorption properties of the stay supported membrane assembly, the chamber pressure rise and subsequent transfer of gas through the supply port to the main cushion area bring about a condition of controlled deflection of the seal components to the action of rising water conditions allowing the seal elements to maintain their function as cushion seal and planing devices without transmitting the effects of these water conditions to the vehicle that they support.

During encounters with water conditions that would tend to bring about seal element deflection up to and including full seal height, compliance will be maintained by contact with and immersion into the surface traversed by the highly flexible element 26 of the stay supported membrane that extends beyond the attachment point of the former cables 24 and the aft convoluted membrane portion 30. During these encounters, planing action will have ceased due to the seal element deflections out of and away from the water surface, but the flexible free end will continue to provide the required main cushion sealing function without inducing heaving or vibration motion to the main seal element, and will allow a smooth transition from and to the planing efforts of main seal element immersion.

During high speed encounters with relatively smooth water surfaces, the planing element of the seal will deflect aft to a position dependent upon the resultant force generated by the drag and hydrodynamic forces manifested by this encounter. As velocity increases, these forces produce a condition that decreases the total wetted area of the stay supported membrane assembly, placing dependence of seal function maintenance upon the flexible free edge of the seal assembly. Its high flexibility enables it to function in this capacity to maintain seal system efficiency by deflecting under the action of local surface discontinuities and vehicle pitching.

The variations of the second embodiment would provide yet another measure of stiffness control to total deflection spectrum of seal operation. Functioning as a flexible member subject to variations in surface irregularities up to those sufficient to produce planing section deflection to the limit of membrane position, the restraining or dampening force exerted by the planer-cushions pressure system will provide a higher measure of compliance or flexibility than would a system employing a higher seal pressure containment system. When deflection of seal element exceeds a value determined by craft design criteria, the planer section would encounter an increasing stiffer reaction to deflection due to the restraint provided by the higher pressure of the membrane element during compression of this member. The overall effect of this feature would be to provide a much stiffer or dampening effect when unrestrained planer motion or accelerations become unduly excessive.

While maintaining compliance to longitudinal variations encountered while traversing over a wide range of conditions, the lateral compliance inherent in the concepts of the stay supported membrane assembly, provides the necessary flexibility to successfully contour surface irregularities and vehicle motions that occur as rotation about the vehicle longitudinal axis.

The embodiments outlined above will serve to produce a flexible seal that can be applied to both fore and aft sealing of cushion area, fore and aft being understood as being indicative of the seals position relative to the forward motion of the vehicle over the surface traverse.

Many changes may be made in the details of the instant invention, in the method and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A planing seal for a vehicle, said vehicle comprising a hull having downward extending sidewalls for forming a plenum chamber therebetween comprising:
   a plurality of juxtaposed elongated supporting members positioned parallel to and between said sidewalls, said supporting members have a stiff section intermediate forward and rearward flexible sections, the forward section being attached to said hull;
   at least one forming member being attached between said hull and said stiff section thereby providing freedom of movement of the flexible sections; and
   a flexible membrane extending the width of said hull between said sidewalls, said membrane having its forward and rearward surfaces spaced apart and fixedly attached in a sealed relationship to said hull and supported at least in part by said supporting members, said rearward surface of said membrane is attached to said hull forward of the hull attachment of said forming members.

2. The invention as defined in claim 1, wherein said supporting members are of unitary construction and have varying thickness along their length.

3. The invention as defined in claim 1, wherein said supporting members are of unitary construction and have varying width along their length.

4. The invention as defined in claim 1, wherein said supporting members are of unitary construction and have varying thickness and width along their length.

5. The invention as defined in claim 1, wherein the forward end of said supporting member is pivotally attached to said hull.

6. The invention as defined in claim 1, wherein said forming members are flat straps.

* * * * *